United States Patent
Dahl et al.

(10) Patent No.: US 9,804,710 B2
(45) Date of Patent: Oct. 31, 2017

(54) TOUCHLESS USER INTERFACES

(71) Applicant: Elliptic Laboratories AS, Oslo (NO)

(72) Inventors: Tobias Gulden Dahl, Oslo (NO); Hans Jørgen Bang, Oslo (NO); Tom Kavli, Nittedal (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 0 days.

(21) Appl. No.: 14/823,095

(22) Filed: Aug. 11, 2015

(65) Prior Publication Data

US 2016/0026340 A1 Jan. 28, 2016

Related U.S. Application Data

(63) Continuation of application No. PCT/GB2014/050443, filed on Feb. 14, 2014.

(30) Foreign Application Priority Data

Feb. 15, 2013 (GB) .................................. 1302701.6
Mar. 20, 2013 (GB) .................................. 1305124.8

(51) Int. Cl.
*G06F 3/043* (2006.01)
*G06F 3/01* (2006.01)

(52) U.S. Cl.
CPC ............ *G06F 3/0433* (2013.01); *G06F 3/011* (2013.01); *G06F 2203/04108* (2013.01)

(58) Field of Classification Search
None
See application file for complete search history.

(56) References Cited

U.S. PATENT DOCUMENTS

| | | |
|---|---|---|
| 2003/0068056 A1 | 4/2003 | Aubauer et al. |
| 2006/0140438 A1 | 6/2006 | Kimura et al. |
| 2012/0162143 A1 | 6/2012 | Kai et al. |
| 2012/0230517 A1* | 9/2012 | Lee .................. G06F 3/043 381/120 |

OTHER PUBLICATIONS

International Search Report dated Jun. 4, 2014 from International Application No. PCT/GB2014/050443.
Written Opinion dated Jun. 4, 2014 from International Application No. PCT/GB2014/050443.

* cited by examiner

*Primary Examiner* — Kenneth B Lee, Jr.
(74) *Attorney, Agent, or Firm* — Beyer Law Group LLP

(57) ABSTRACT

An electronic device having a touchless user interface for providing at least one input to the device, said touchless user interface comprising at least one ultrasound transmitter arrangement arranged to transmit ultrasonic signals and at least one ultrasound receiver arrangement arranged to receive reflections of said ultrasonic signals from an input object, wherein the device further comprises a substantially continuous outer surface portion, wherein said outer surface portion comprises at least one localised zone 30' having a greater compliance for moving in response to impingement by said ultrasonic signals or reflections such that said localised zone 30' forms part of said transmitter arrangement and/or said receiver arrangement.

29 Claims, 12 Drawing Sheets

FIGURE 7
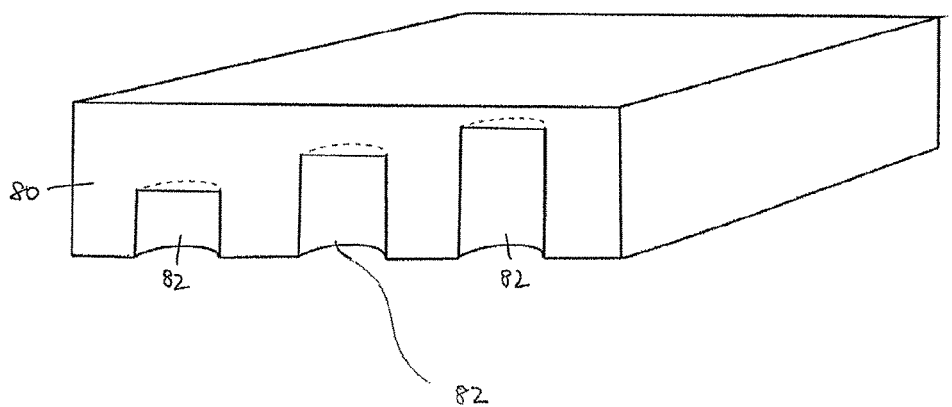
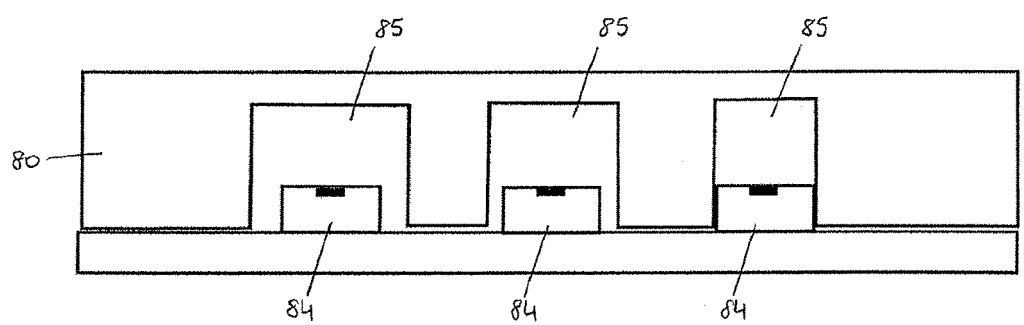
Figure 8

Figure 9
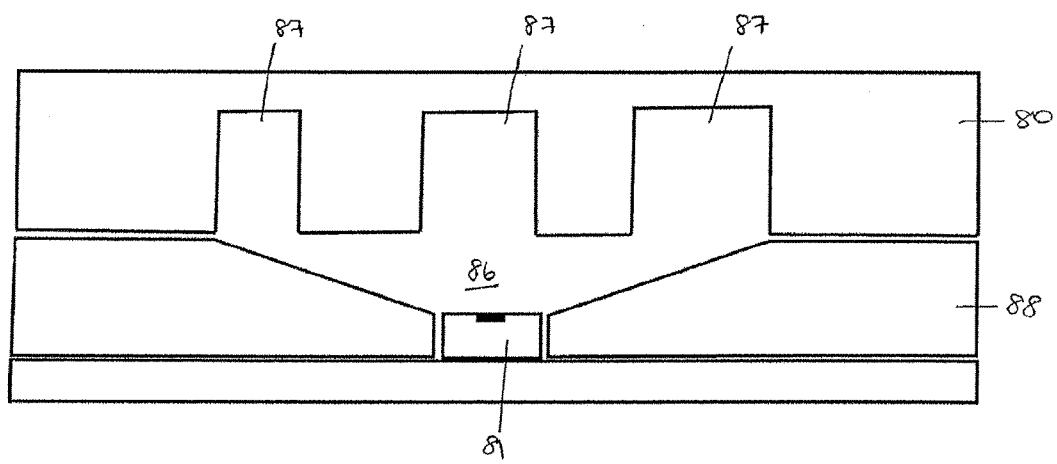
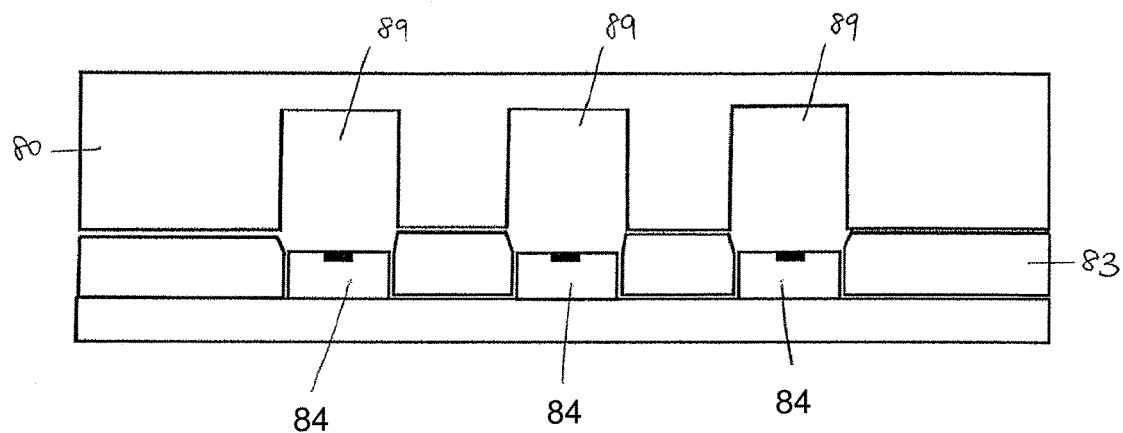
Figure 10

Figure 11
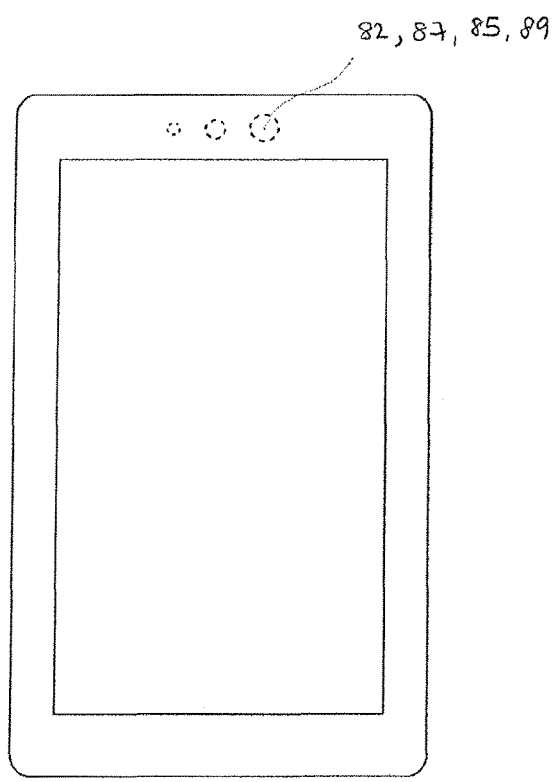
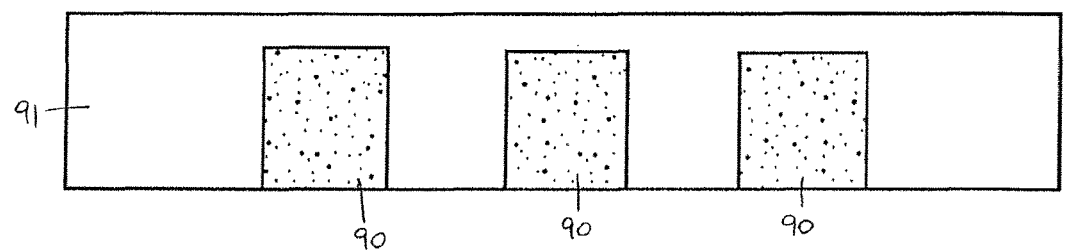
Figure 12

Figure 13
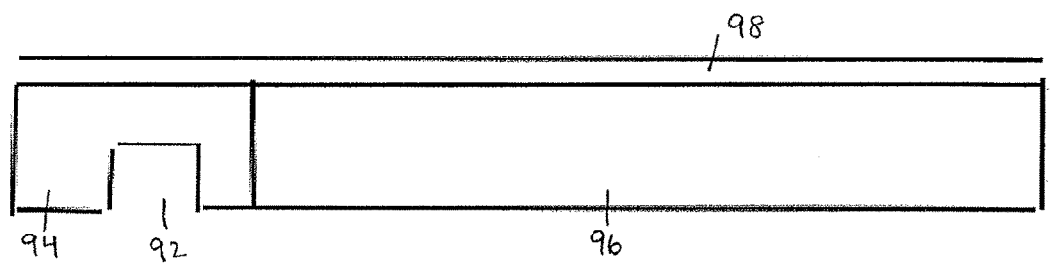
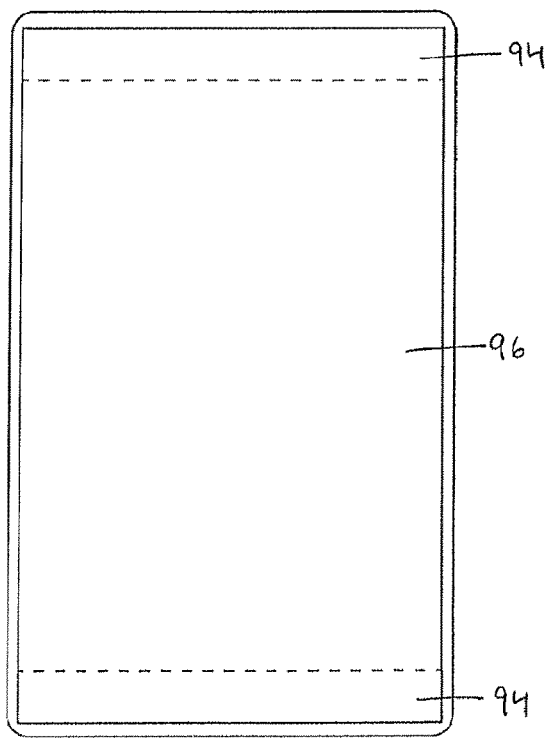
Figure 14

Figure 18
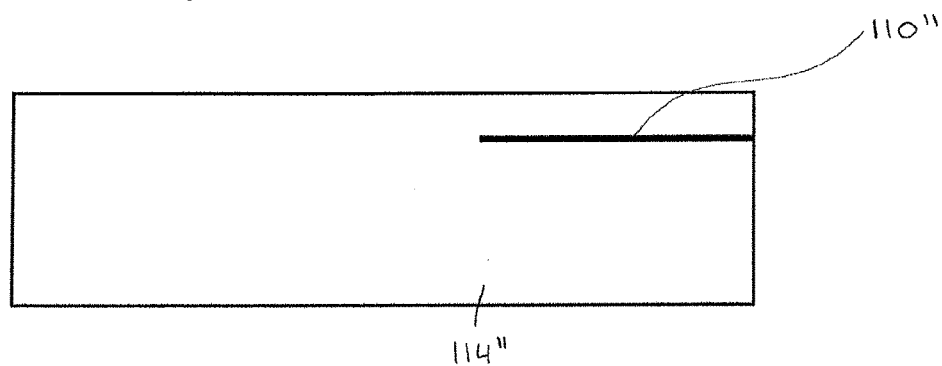
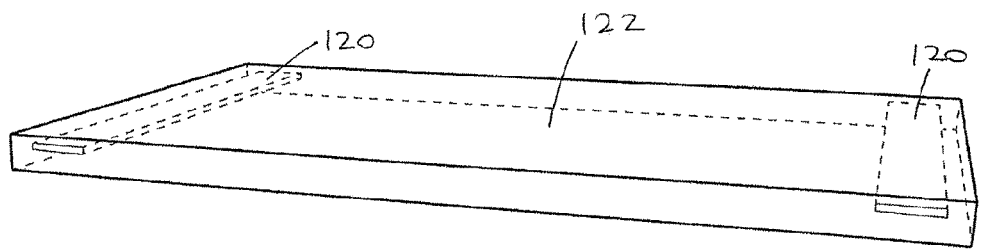
Figure 19

TOUCHLESS USER INTERFACES

CROSS-REFERENCE TO RELATED APPLICATIONS

This application is a Continuation of International Application No. PCT/GB2014/050443, filed on Feb. 14, 2014, which claims priority to GB Application Nos. 1302701.6, filed on Feb. 15, 2013 and 1305124.8, filed on Mar. 20, 2013. All of these priority applications are incorporated by reference herein in their entirety.

This invention relates to the control of electronic devices through the use of signals, particularly ultrasonic signals, reflected from an input object such as a human hand.

In recent years there has been a trend in consumer electronic devices to move away the use of physical keyboard and button interfaces to more 'natural' interfaces. These are currently based around touch sensitive screens and voice recognition, although increasingly interest is growing in the extra possibilities offered by touchless gesture recognition. However, in order to be able to get the most out of the capabilities of touchless, additional sensors are required on the device for monitoring the environment and detecting inputs signals. One example of this is the use of ultrasonic signals for touchless technology, which requires multiple transducers in order to recognise reliably a range of gestures.

Alongside this trend, there has also been an increase in the perceived importance of the aesthetics of electronic goods, with physical design becoming a key selling point. However the two trends can often be at odds with each other as it is difficult to integrate additional sensors whilst maintaining a sleek, minimalist design.

Ultrasonic gesture recognition uses ultrasound enabled transmitters to transmit signals towards a scene, then receives the echoes from an input object in front of the device, typically the user's hand, using a set of sensing receivers. The sensors are thus generally placed on the front of the device.

While MEMS (microelectromechanical systems) speakers and microphones may potentially be small enough to be integrated into media devices such as smart-phones, they conventionally require holes in the front surface of the device in order for their membrane or diaphragm to be in direct contact with the atmosphere and therefore the incoming signals. However, this does not fit with the objective of the physical design, as the holes needed can be seen by the user and so cannot provide a largely unbroken smooth surface as is desired. In addition, the use of a number of holes allows for access to the inner layers of the device, leaving it vulnerable to damage, and the ingress of moisture, dust etc.

The present invention aims to address the problems set out above. When viewed from a first aspect, it provides an electronic device having a touchless user interface for providing at least one input to the device, said touchless user interface comprising at least one ultrasound transmitter arrangement arranged to transmit ultrasonic signals and at least one ultrasound receiver arrangement arranged to receive reflections of said ultrasonic signals from an input object, wherein the device further comprises a substantially continuous outer surface portion, wherein said outer surface portion comprises at least one localised zone having a greater compliance for moving in response to impingement by said ultrasonic signals or reflections such that said localised zone forms part of said transmitter arrangement and/or said receiver arrangement.

Thus it will be seen by those skilled in the art that in accordance with the invention rather than requiring holes to be provided in the outer surface to accommodate ultrasonic transmitters and/or receivers, the outer surface is altered at certain points to allow a distinguishable response to the ultrasonic signals which can be transmitted or detected from the rear of the surface without requiring holes in the surface.

The greater compliance could be achieved with a different material to the rest of the surface which is disposed such that it gives the outer surface portion a substantially continuous appearance. For example a hole in the surface (e.g. a glass surface) could be formed which is closed by a plug of more acoustically compliant material (e.g. a plastics material) which is flush with the outer face of the surface.

In a set of embodiments however an outer layer of said outer surface portion is continuous, such that there is no break or boundary in the surface, and the surface is thinner in said localised zones of greater compliance. The outer surface portion could be monolithic and the localised greater compliance could simply result from a variation in the thickness of the surface. Additionally or alternatively the outer surface portion could comprise a number of layers with the outer layer being monolithic and thinning of the surface portion as a whole deriving from a thinning in or break in one or more inner layers.

The Applicant has appreciated that a locally different vibration compliance will give rise to a local change in resonant frequency which allows the effect of ultrasonic vibrations passing through it and/or around it to be determined In a set of embodiments the localised zone has a greater compliance by the surface of the device having reduced thickness.

Arrangements such as those set out above are considered novel and inventive in their own right and thus when viewed from a further aspect the invention provides an electronic device comprising a touchless user interface and having a continuous front face, locally thinner in one or more places to allow greater movement by ultrasonic signals impinging thereon.

Although it is envisaged that the localised zones could have a raised or indented profile relative to the rest of the surface—e.g. being formed as bumps, dimples, ridges etc. in a set of preferred embodiments the surface is flat.

Where the localised zone of greater compliance is part of a transmitter arrangement several configurations are possible. In one set of embodiments a vibrating element is physically coupled to the outer surface in the localised zone. Here the more compliant zone of the surface effectively acts as the diaphragm of the transmitter. In another set of embodiments a self-contained transmitter is provided spaced from the outer surface. In these embodiments the outer surface acts as a secondary 'transmitter' driven by impingement of the signal generated by the real transmitter.

Similarly where the localised zone of greater compliance is part of a receiver arrangement the configurations outlined are possible. Thus in one set of embodiments a vibration sensitive element—e.g. a piezo-electric film or a contact microphone—is physically coupled to the outer surface in the localised zone. Here the more compliant zone of the surface effectively acts as the diaphragm of the receiver. in another set of embodiments a self-contained receiver is provided spaced from the outer surface. In these embodiments the outer surface acts as a secondary 'transmitter' driven by impingement of the incoming reflected signals.

The greater compliance of the localised zone may, as set out above, be achieved by the surface simply being thinner in that zone. However the Applicant has appreciated that a similar effect can be achieved by measuring the vibration as a point within the depth of the surface layer such that there is less material (e.g. glass) between the measurement point and the exterior which in turn means such that in the localised zone there is less mass of material to be moved by the incoming sound waves. In one set of embodiments for example a pressure sensitive transducer such as a piezo-electric film or other contact microphone could be inserted into the surface. This could be achieved by forming a hole or slit in the edge of the surface member or layer into which the transducer is inserted. The density, the area and the distance of the transducer from the outer surface may be chosen to match to the frequency of the acoustic signal of interest.

It will be appreciated that in the embodiments outlined above it is possible for the same physical arrangement to be used for both transmitting and receiving. However in the case of receiving there are further configurations which can be used. More specifically in another set of embodiments the device comprises an arrangement for sensing movement of said localised zone comprising means for emitting a signal towards the rear of said outer surface in the localised zone and means for detecting said signal after reflection from said surface. The signal could be optical, e.g. a laser, or acoustic, e.g. ultrasound. Movement of the outer surface could be measured for example by measuring phase changes in the reflected signal. In the example of a laser this could be done by using an interferometer arrangement such as a Michelson or Fabry-Perot interferometer. Such optical arrangements can be highly sensitive such that a lesser increase in compliance—e.g. less localised thinning—is necessary. In preferred embodiments employing optical methods the back of the outer surface portion, at least in the localised zone, is treated to enhance its reflectivity. This could be for example through a reflective coating.

In a set of embodiments vibration in the localised zone is measured by directing a measurement signal such as a laser beam through the material of the outer surface portion in order that the beam passes through said material in the localised zone. For example where the localised zone comprises a thinner section of glass the measurement beam would pass through the thinned section in accordance with such a feature. The beam could be introduced at an edge of the surface for example. The beam may be arranged to pass substantially parallel to the outer surface.

In a set of embodiments the localised zone is tuned to have a resonant frequency within the band of the ultrasonic signals. This may be achieved through one or more of the size (e.g. diameter), thickness and material thereof.

In an exemplary set of embodiments the localised zone is between 1 and 10 mm wide. It may be circular. Preferably a plurality of localised zones is provided. For example there may be between 2 and 20, e.g. between 4 and 16.

In a further set of embodiments a plurality of localised zones is provided, each having a different resonant frequency. This allows a broader bandwidth signal to be used whilst retaining the benefit of signal strength optimisation through resonance. There may be a transducer (transmitter or receiver) for each zone, which may have a frequency response matched to the resonant frequency of the zone, or a plurality of zones may be grouped so as to be associated with a common transducer which may then have a wider band frequency response.

In a set of embodiments an acoustic cavity is provided behind the localised zone of greater compliance. Such a cavity would typically be defined on one side by the localised zone of the outer surface portion and have in addition one or more side walls extending away from the localised zone. In arrangements where the outer surface is locally thinner, the adjacent, thicker regions of the outer surface portion could provide said side wall(s), at least partially. The acoustic cavity may help to enhance the vibration being transmitted or received by the relevant transducer, particularly in arrangements in which a transducer (transmitter and/or receiver) is provided in the cavity remote from the outer surface portion. In a particular advantageous arrangement this feature has been found to allow an ultrasound transmitter to be mounted facing away from the front surface from which the ultrasonic signals are required to emanate. This is advantageous as the current design of transmitters is relatively large and the ability to alter the orientation in this way facilitates the compact design of the device.

Preferably the dimensions of the cavity are such that it has a resonant frequency within the band of the ultrasonic signals. Having a resonant cavity can allow optimum transfer of a small vibration through the outer surface portion and thus facilitate reception and/or transmission. Indeed the Applicant has appreciated that it may not be necessary to have a localised zone of greater compliance—e.g. through being thinner—if such a cavity is employed and thus when viewed from a further aspect the invention provides an electronic device having a touchless user interface for providing at least one input to the device, said touchless user interface comprising at least one ultrasound transmitter arranged to transmit ultrasonic signals having a frequency band and at least one ultrasound receiver arranged to receive reflections of said ultrasonic signals from an input object, wherein the device further comprises a substantially continuous outer surface portion, wherein at least one of the transmitter and the receiver is provided behind said outer surface portion in a resonant cavity having a resonant frequency within said frequency band.

In a set of embodiments of the first or second aspect of the invention, at least one acoustic cavity is provided behind the outer surface portion as part of said transmitter arrangement or said receiver arrangement, said cavity having an echoic signature based on its shape and the device being arranged to process reflections received by the receiving arrangement to determine a direction from which the reflection was received by taking into account said echoic signature.

Such arrangements are novel and inventive in their own right and thus when viewed from a further aspect, the invention provides an electronic device having a touchless user interface for providing at least one input to the device, said touchless user interface comprising at least one ultrasound transmitter arrangement arranged to transmit ultrasonic signals and at least one ultrasound receiver arrangement arranged to receive reflections of said ultrasonic signals from an input object, wherein the device further comprises a substantially continuous outer surface portion, wherein at least one of the transmitter and the receiver arrangement is provided behind said outer surface portion and comprises an acoustic cavity having an echoic signature based on its shape, the device being arranged to process reflections received by the receiving arrangement to determine a direction from which the reflection was received by taking into account said echoic signature.

The cavity may be in an area of the outer surface portion which has a localized zone of greater compliance, but this is not necessary; the outer surface portion may be of constant thickness/compliance.

The arrangements described above are predicated on the realisation that for certain cavity shapes, the transmitted ultrasound signals or reflections thereof from the input object, that traverse the cavity are given a distinctive echoic signature which is dependent on the angle at which they enter or leave the cavity. As the effect of the cavity can be measured or pre-calculated it can be used to help determine the angle of propagation of the signals or reflections. This may be carried out using a mathematical function, for example a linear inverse, but preferably it is carried out using a convolution function.

By using the echoic signature imparted by the cavity to estimate a direction of the signals or reflections, an effect akin to beamforming may be achieved but without employing $\lambda/2$ spaced array of transducers—that is an array in which adjacent transducers are separated by a maximum of $\lambda/2$, where $\lambda$ is the wavelength of the transmitted signals, in order to collect sufficient information to resolve the direction of the input object. Indeed in some embodiments only a single transducer may be arranged to transmit signals into or receive reflections from the cavity although in other embodiments a plurality is provided, allowing a degree of spatial resolution of vibrations in the cavity. However it may still not be necessary to provide a full $\lambda/2$ set of transducers. Having fewer transducers reduces material costs and processing power required. There is a further advantage over arrangements in which input from a screen or front surface as a whole needs to be processed, as it permits simpler functions to be used and therefore reduces the power needed.

The acoustic cavity may have any shape, ideally one which gives a distinctive signature. In a set of embodiments the cavity is elongate—i.e. longer in one dimension than in the perpendicular dimension. The longer dimension may be more than 2, 5 or 10 times the shorter dimension, Such an elongate cavity may have a constant depth, but in a set of embodiments the depth varies along the length (longest dimension) of the cavity. This prevents the cavity having too strong a directional reaction to incoming signals. However, the cavity shape may be more complex and may comprise complex variation in at least one of its width and its depth, producing a significant signature echo pattern.

A single acoustic cavity of the kind described above may be provided but in a set of embodiments a plurality of cavities is provided. In a set of embodiments, these cavities are arranged on at least one side of the screen. Preferably, at least two cavities are provided perpendicular to each other on different respective sides of a screen.

In a set of embodiments, the cavity conforms to the shape and size of the ultrasonic transducer. This may be the case when the ultrasonic transducer is a contact microphone, e.g. based on a resonating film.

Where a cavity, such as a resonant cavity, containing an ultrasound transducer is provided as set out above, it may be sealed. However in a set of embodiments an opening is provided in the cavity providing gaseous communication with the exterior of the device via an aperture on a face of the device away from the outer surface portion specified hereinabove. For example the cavity may be open to the side of the device whereas the outer surface portion is at the front of the device. This beneficially allows the transducer to operate additionally as an audible acoustic transducer, especially in the case of a receiver which can then, for example, be used as part of an adaptive noise cancellation system. Clearly the comparative reduction in materials cost on required size are important benefits to device manufacturers.

Such an arrangement is also novel and inventive in its own right and thus when viewed from a further aspect the invention provides an electronic device having a touchless user interface for providing at least one input to the device, said touchless user interface comprising at least one ultrasound transmitter arranged to transmit ultrasonic signals and at least one ultrasound receiver arranged to receive reflections of said ultrasonic signals from an input object, wherein the receiver is provided in a cavity behind a substantially continuous outer surface portion and wherein an opening is provided in the cavity providing gaseous communication with the exterior of the device via an aperture on a face of the device away from the outer surface portion.

The idea of providing localised zones of different resonant frequencies which is set out above may be implemented using cavities having different resonant frequencies through having different characteristics—e.g. different sizes. The cavities may range in depth, for example between 10% and 90% of the thickness of the outer surface portion. They may also range in width, or radius for circular cavities.

The multiple cavities could be grouped together and/or arranged around the device. Where they are each provided with a transducer this may of course be provided in the cavity. However this is not essential. For example a composite cavity may be provided having discrete sections with different resonant frequencies but with each section being coupled for communication with a common transducer—e.g. through being open on one side.

Where provided, cavities in the bulk material of the outer surface portion may just be filled with air. Alternatively however a different material may be used to fill them fully or partially. The material choice will in general influence the resonant frequency and thus this gives another characteristic which may be varied to achieve the desired resonant frequency. Filling the cavities also helps to preserve structural strength in the surface layer of the device—which is e.g. made of glass.

Although it is envisaged that cavities could contain a transducer, either individually or within a composite cavity complex, this is not essential. In another set of embodiments a resonant cavity is provided which does not contain a transducer. For example a pocket could be formed in the glass or other material. Vibration of the air or other material inside the cavity may be measured from externally of the pocket—e.g. optically using a laser as is described elsewhere herein. Alternatively, the vibration may be picked up using a pressure sensitive transducer such as a piezoelectric film or contact microphone, as described elsewhere herein outside the cavity (e.g. in a further cavity).

Having a plurality of resonant cavities is advantageous as explained above since the individual cavities enhance the signals being transmitted/received but between them the cavities have broadband characteristics as opposed to the naturally narrowband characteristics of each individual cavity. However the Applicant has recognised a shortcoming with such an arrangement which results from the necessary spatial separation of the cavities. This means that different frequency components of a composite signal will originate from, or be received at, slightly different places. This will lead to some smearing of the signals received. In some circumstances this may not cause any particular problems but in other circumstances it may be desirable to compensate for it.

In a set of embodiments the apparatus is arranged to generate an estimated location of the input object and to use said estimated location to process said reflections to characterise the location and/or movement of the input object. Assuming that the relative spatial positions of a number of cavities is known, this can allow compensation to be made for the slightly different path length from each to the input object.

This is novel and inventive in its own right and thus when viewed from a further aspect the invention provides an electronic device having a touchless user interface for providing at least one input to the device, said touchless user interface comprising at least one ultrasound transmitter arranged to transmit ultrasonic signals and at least one ultrasound receiver arranged to receive reflections of said ultrasonic signals from an input object, the device further comprising a substantially continuous outer surface portion, wherein at least one of said transmitter and said receiver is disposed beneath said outer surface portion so as to transmit or receive signals through said outer surface portion, the apparatus being arranged to generate an estimated location of said input object and to use said estimated location to process said transmissions and/or reflections to characterise the location and/or movement of the input object.

In a set of embodiments of arrangements in which the estimated location of the input object is used to process the reflections, a different delay factor is applied to components of different frequencies. This allows compensation for the differing spatial positions of resonant cavities of different frequencies thereby mitigating the smearing effect referred to above. The delay factors might be approximated by applying phase shifts when the signals are sufficiently narrowband.

In a set of embodiments, a plurality of resonant cavities are used for transmission with a single resonant cavity for receiving reflections.

In a set of embodiments, a delay factor is applied to individual signal streams, i.e. either transmissions or reflections associated with different respective cavities. This may be used to offset the difference in distance between transmitters/receivers and the input object.

The signals originating from the resonant cavities may be identical to one another except for delay factors, increasing the overall transmission strength. However, in a set of embodiments each cavity is arranged to have a specific resonant frequency and therefore transmits and/or receive signals at a specific frequency in order to exploit the resonance. This arrangement may produce a double gain, as in addition to increased overall signal strength the combined signal may have a wider bandwidth than would be possible from a single cavity. In a set of embodiments, each resonant cavity transmits a part of a chirp signal, such that a combined signal from a plurality of resonant cavities forms a wideband chirp.

It has come to the applicant's attention that the use of transmit signals which are substantially non-overlapping in the frequency domain allows the individual signals to be separated after being received and combined. In a set of embodiments, a delay function is applied to a combined signal of reflections. In the case of a series of narrow-band cavities, they may be substantially non-overlapping in the frequency domain, meaning that they can be separated after they are combined, and any delay compensation can be carried out on the combined signal by applying different delays to different frequency bands. This is a different method to that used in conventional beamforming Furthermore, by applying a delay factor to a combined signal of reflections, a feedback loop is not required to get a desired output signal, as it is not necessary to retransmit in order to alter the final signal as the received signal is altered directly, which is necessary in systems where beamforming is carried out before transmission. In addition, for systems having multiple receivers with substantially non-overlapping resonant frequencies, it may not be necessary to have an analogue-to-digital converter for each receiver as the analogue signal can be combined and then sampled. This may reduce both the material costs and power consumption for the device.

In a set of embodiments, only one transmitter cavity is used with a plurality of receiver cavities. In this arrangement, the receiver cavities may be identical, or they may receive different components of a transmitted signal. Compensation may therefore be applied both for the different cavity positions and for the different signal components at each cavity. It can therefore be seen that delay factors may be applied after reflections from an input object have been received at the receiver cavities. This allows a plurality of input object locations to be tested for without retransmitting a signal, as the different candidate adjustments can be applied at the receiving end.

In a set of embodiments, a set of delay factors is applied based on said estimated location of the input object. This allows a delay to be processed based on a decision of the location of the reflector. It may be assumed that the estimated position is correct, and therefore the relevant delay factors are applied to the transmissions and reflections.

In a set of embodiments, however, the apparatus is arranged to test for a number of different locations and delay factors and select a location with the best match. The best match may be the strongest signal. Furthermore, in a set of embodiments, the number of different locations to be tested may be limited using prior knowledge, for example using a previously measured location or a required region for a particular input. For example, if a particular input is required for a function, only locations within a desired input area may be tested. This limiting of the testing positions may resolve ambiguities in processing of input signals and allow power consumption to be reduced by reducing the number of locations which must be tested.

Where an embedded pressure sensitive transducer is provided this may be thought of as a narrow cavity which is filled with the transducer. The transducer will be made from a material different from the surface (e.g. glass) and may contain an internal cavity, causing a change in density similar to when the cavities are filled with resonating material. This allows the transducer to pick up vibrations due to ultrasonic pulses without the need for a further cavity, although, as mentioned above, this arrangement may also be used with a further cavity.

As used herein the band of the ultrasonic signals is intended to refer to the frequency range in which at least 50% of the transmitted energy is contained. The resonant frequency of a cavity is intended to refer either to the centre frequency of the resonance band or to the frequency which has greatest response.

In all aspects of the invention the outer surface portion could comprise an entire face of the device. This is not essential however. For example there may be a portion of the face which includes one or more apertures for transmitters, receivers buttons etc. The invention might still be advantageously be employed to reduce the number of apparent apertures for the number of transducers. The recited outer surface portion may be of a different material to the rest of the front of the device. In one example the recited outer surface portion could be made of Plexiglass, which is easier to machine and may have preferable resonance characteristics, whilst the rest of the front of the device is made from Gorilla Glass(™) available from Corning, Inc. as is conventional. Where two different materials are provided they could be suitably bonded together to make a continuous surface. Additionally or alternatively a thin laminate layer may be provided over both to provide the continuous surface.

In a set of embodiments the outer surface portion is disposed on a face of the device intended to face the user in use—i.e. the front face—and the at least one transmitter is arranged to transmit towards an input object in front of the device.

In a preferred set of embodiments the outer surface portion includes a touch screen. Depending on the touch screen technology employed (various of said technologies being known per se) it may be possible to integrate the ultrasonic transmission and detection arrangements disclosed herein with the touch screen. For example, if a sufficiently transparent touch screen is used, this can be placed below the outer surface portion but above the ultrasound transducer(s) so that both touch and touchless gesture recognition can be supported from the same part of the screen.

Alternatively, a non-transparent touch screen may be used, with the transducer(s) being placed above the touch screen. While this would occlude these sections of the touch screen, the affected area may be sufficiently small—e.g. as little as a single pixel—that functionality would not be affected significantly.

It is not essential for transducers to be intimately integrated with a touch screen as outlined above. In another set of embodiments for example one or more transducers may be placed around the edge of the touch screen but still under the same outer surface portion as the touch screen such that they do not affect the functionality at all and simplifying the integration of the microphones with the touch screen. Such an arrangement can still deliver the benefit of hiding transducers by avoiding the need to provide holes in an otherwise continuous surface. However given that it is a design objective in many modem devices to maximise the proportion of the front surface on which a touch screen is provided, the effectiveness of arrangements in which transducers are separated from touch screen could be compromised. However in a set of embodiments this difficulty is addressed by arranging for a plurality of transducers to operate coherently with one another to implement beamforming For example the device may be arranged to process signals received by a plurality of receivers such that linear or other combinations of measured received signals are generated to represent deflections at arbitrary points, to create 'virtual receivers' partially to overcome these design limitations. The beamforming methods involve using the combined inputs to infer motion of the surface in at least one position which does not actually have a receiver.

In all aspects of the invention the outer surface portion could comprise any suitable material—e.g. a suitably robust plastics material. In a set of embodiments however the outer surface portion comprises glass. Indeed it is envisaged that any glass which is currently used for smart-phone touch screens could be used.

A number of embodiments of the invention will now be described, by way of example only, with reference to the accompanying drawings in which:

FIG. 7 shows a covering glass for a device in accordance with the invention;

FIG. 8 shows a partial cross-section of glass embodying the invention;

FIG. 9 shows a partial cross-section of an alternative embodiment;

FIG. 10 shows a partial cross-section of a third embodiment;

FIG. 11 shows a device in accordance with the embodiments of FIGS. 8 to 10;

FIG. 12 shows a partial cross-section of an embodiment using two different materials;

FIG. 13 shows a partial cross-section of a further embodiment;

FIG. 14 shows a device according to the embodiment of FIG. 13;

FIG. 18 shows an alternative embodiment of the device that does not use cavities;

FIG. 19 shows a device according to the embodiments of FIGS. 16 to 18;

Figure 1:
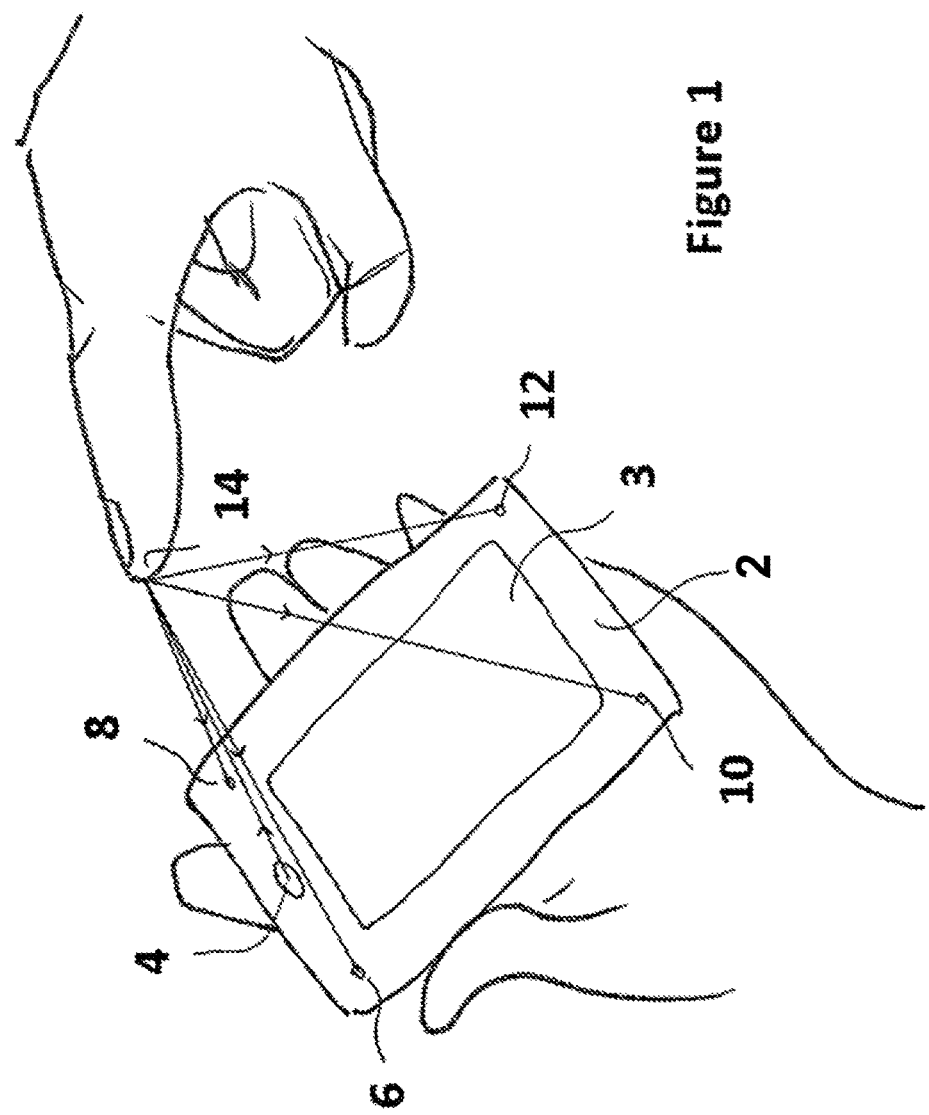
FIG. 1 shows schematically a touchless gesture system for reference purposes only.

FIG. 1 shows a prior art illustration of the basic principles of a touchless detection system. An electronic device such as a smart phone 2 has a touch screen 3 taking up most of the front surface. Around the touch screen 3 are arranged an ultrasonic transmitter 4 and four ultrasonic receivers 6, 8, 10, and 12. The respective transducers are provided within the body of the phone 2 but corresponding apertures are provided in the front glass layer to allow the air-borne ultrasound to reach them.

When an ultrasonic signal is transmitted from the transmitter 4 towards the user, it is reflected from the user's finger 14. The reflected signal is then received by the receivers 6, 8, 10,12 and the received signals (for example about time of flight) are then processed to calculate the position and movement of the finger 14. Further exemplary details of how this is carried out may be found in WO 2009/115799.

Figure 2:
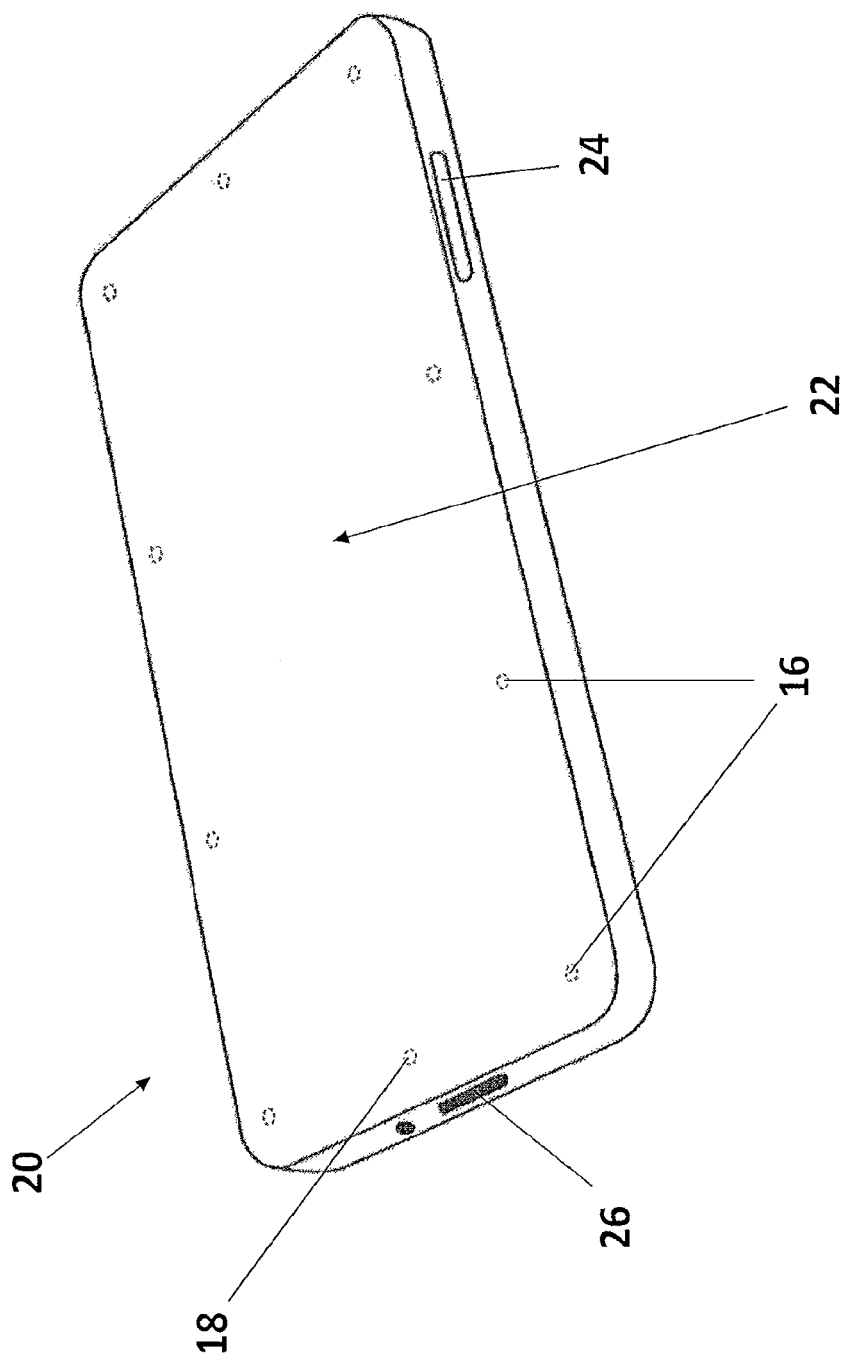
FIG. 2 shows a touchless enabled smart-phone embodying the invention.
Figure 3:
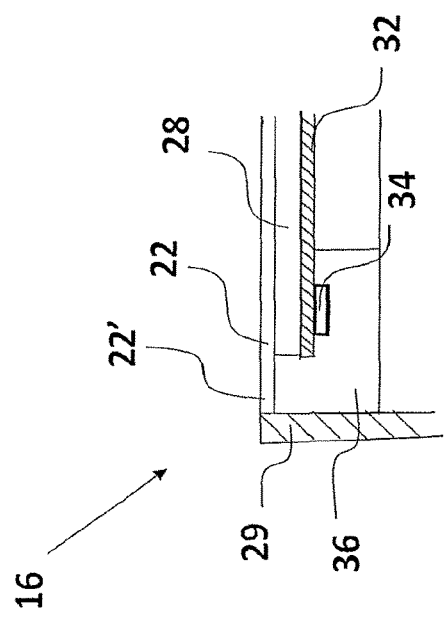
FIG. 3 shows a partial cross section of a transmitter portion of the embodiment in FIG. 2.
Figure 4:
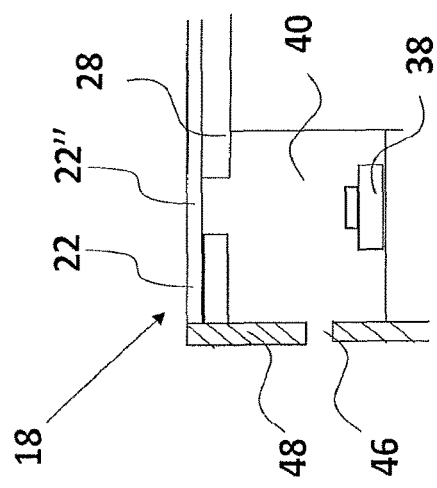
FIG. 4 shows a cross section of a receiver portion of the embodiment in FIG. 2.

FIGS. 2 to 4 show an embodiment of the invention which uses touchless gesture detection in accordance with the invention. FIG. 2 shows an arrangement in which a number of transmitters 16 and receivers 18 are provided at the front of a smart phone 20, around the edge of the front surface 22. However the transmitters 16 and receivers 18 are shown as dotted lines since they are not associated with apertures in the front surface 22 but rather they are disposed under the glass, such that the front surface 22 is flat and continuous as will be explained hereinbelow. However, there are a number of openings around the sides of the device 20 which can be used for buttons 24 or access to acoustic cavities 26, as well as other things such as sockets.

FIG. 3 shows a partial cross section of the transmitter portion 16 of the embodiment shown in FIG. 2. In this embodiment, the touchless system is combined with a touch display 28, which is attached between the front piece of glass 30 and the PCB layer 32. It will be noted that the touch display 28 stops short of the side bezel 29 of the phone whereas the front glass 30 extends up to meet the bezel. This means that the although most of the front surface is double-layered, there is a localised zone 30' which is thinner and therefore more compliant to being caused to vibrate by when ultrasound impinges on it.

The transmitter transducer 34 is received in a cavity 36 formed inside the device and bounded by the localised zone 30'. The cavity is tuned in size and shape to the centre frequency of the ultrasound with which the transmitter is driven in use in order to encourage resonance. It will be noted that the transducer 34 need not be mounted facing the glass 30 and this facilitates compact construction since the transmitter is a relatively large component.

FIG. 4 shows a cross section of a receiver portion 18 of the embodiment. A MEMS microphone 38 is received in a further cavity 40. Again the cavity is tuned in size and shape to the centre frequency of the ultrasound with which the transmitter is driven in use in order to encourage resonance. A further localised zone 30" in which the glass 30 is thinner is provided by a break in the touch screen 28. Again this provides an area of greater compliance to movement above the microphone 38.

The cavity 40 in this Figure is not sealed as there is an opening 46 in the side wall 48 of the device.

In use, at least the transmitter 16 transmits an ultrasonic signal towards the user. This is achieved by the transmitter transducer 34 emitting an ultrasonic signal into the cavity 36, which is then reflected from both the base and the side in resonance, before being transmitted through the localised zone 30' of the front protective glass through vibrations thereof.

The transmitted signal is reflected from an input object, i.e. a user's hand as described with reference to FIG. 1, before being received by the receiving portion 18 of the device 20.

As the signal impinges on the receiver localised thinner zone 30", it causes it to vibrate. The microphone 38 is able to pick up the signal due to the vibration of the glass 30" replicating the signal within the cavity 40, as it acts as a diaphragm for the receiver 18. In this embodiment, the opening 46 in the cavity allows for the microphone 38 also to detect audible signals for other purposes such as adaptive noise cancellation.

The ultrasonic signals received will then be processed in order to calculate the motion of the input object as previously described.

Due to the positioning of the receivers 18, i.e. around the edges of the touch screen portion 22, they may not be in ideal positions for complete functionality of the touchless technology. However, through the use of beamforming methods, the inputs of the receivers 18 that are already available on the device may be combined to infer motion of the surface in positions where there is not actually a receiver 18.

Figure 5:
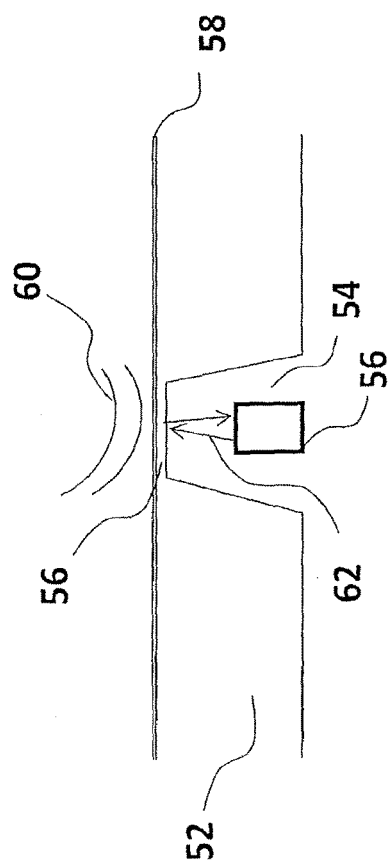
FIG. 5 shows another embodiment of the invention using an optical measuring system.

FIG. 5 shows an alternative embodiment of the system which uses light signals to measure the vibrations of the acoustic membrane 50. The cover glass 52 of the device is thinned such that there is a cavity 54 over an optical read out unit 56. The entire device is covered by a hard surface covering 58, which provides protection for the device and ensures a smooth front covering. In use, an acoustic pressure wave 60 causes the membrane 50 to vibrate. The light signals 62 from the optical unit 56 are reflected by the membrane 50, and these reflections are registered and measured by the optical read out unit 56 in order to calculate the motion of the input object.

Figure 6:
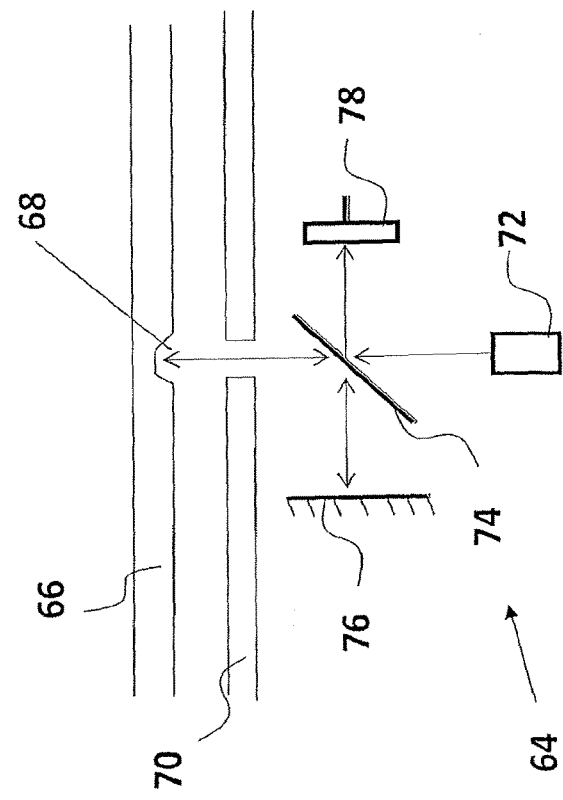
FIG. 6 shows an alternative optical system of measurement, which uses an interferometer for measuring surface deflections.

FIG. 6 shows an embodiment of the system which uses a Michelson interferometer 64 for measurement of the vibrations caused by incoming ultrasonic waves. The acoustic membrane 66 has a cavity 68 etched into it, which is aligned with a gap in the touch and display layer 70 directly below. In line with the cavity 68 created by the two layers is a Michelson interferometer 64. This is formed from a light source 72, a beam splitter 74, a reference mirror 76 and a photo detector 78. In use, the light beam from the source 72 is split at the beam splitter 74, with part travelling to the acoustic membrane 66, and part to the reference mirror 76. These beams are then reflected, and recombine at the beam splitter 74 to produce an interference pattern at the photo detector 78. This interference pattern can be used to determine the path difference between the two beams, from which the distance travelled to the acoustic membrane and therefore the degree to which it was displaced by vibrations can be measured. This allows for very accurate measurement of the movement of the glass.

FIG. 7 shows a cross-section of a front layer 80 of a further device in accordance with the invention. In this embodiment, three cavities 82 of different sizes are formed in a monolithic piece of glass, but the number of cavities could vary. The cavities range in depth from 40% to 90% of the glass depth, and are each tuned to a different resonant frequency. Each cavity 82 has its own ultrasonic receiver (not shown), tuned to that particular wavelength. As there are a number of receivers operating at different wavelengths, the overall effect is that of a broadband device, but as each cavity is operating at resonance, the signals are all maximised, which would not happen with a single cavity and broadband receiver.

FIG. 8 shows another embodiment using a combination of different sized cavities 85, each containing a narrow band receiver 84. However, in this embodiment the cavities vary in width rather than height as in FIG. 7. It is also possible to have an embodiment in which both the height and width of the cavities vary. This would require less variation in a particular direction to achieve the same change in resonant frequency.

Alternatively, the device may instead use a composite cavity 86, as shown in FIG. 9. Here, the cavity 86 has several discrete sections 87 of different dimensions which each have their own resonant frequency. However, these communicate with a common broadband receiver 81. An intermediate layer 88 is provided which channels the vibrations from the discrete sections 87 to the receiver 84. While this embodiment requires fewer receivers, it does not have the benefit of the receiver being able to be tuned to a particular frequency, so a better broad response is required to achieve similar performance.

In another embodiment, shown in FIG. 10, in order to adjust the size of the resonant cavities 89 without changing the thickness of the glass 80, a plastic or glass spacer 83 can be introduced. Here, the receivers 84 are disposed below the lower surface of the glass 80, changing the resonant frequencies of the cavities. This could be used in combination with cavities that vary in height or width, or alternatively in addition to a composite cavity.

FIG. 11 shows a device demonstrating the possible positions of a series of cavities 82 in accordance with the previously described embodiments. They are shown as dotted lines because the cavities are under the upper surface of the device. The cavities 82 are arranged such that they could be used with either the embodiment of FIG. 8 or FIG. 9. Such a combination of cavities 82 could be repeated around the outer region of the device for example.

FIG. 12 shows a cross section of an embodiment where the cavities in the covering glass 91 are filled with a different material 90 rather than being filled with air as in the previous figures. Here, an array of cavities of the same size is used, but filled cavities could be used for combinations of cavities as in FIGS. 7 to 10. The material may act to enhance resonance.

FIG. 13 shows a partial cross section of a device which uses a combination of different glass types. A number of cavities 92 (here only one is shown) are formed in Plexiglass 94, with the touch screen portion of the screen being formed from Gorilla Glass(™) 96. The two types of glass are covered with a thin laminate layer 98, providing a smooth, uninterrupted finish for the device. An example of the division between the two types of glass is shown in FIG. 14, where the Gorilla Glass(™) 96 is bordered at the top and bottom by Plexiglass 94 containing cavities and transducers (not shown) at the top and bottom of the device. However, the proportions of Plexiglass 98 and Gorilla Glass (™) 96 may be altered, preferably such that the area of Plexiglass 98 is minimised, but it can also be changed in order to maximise the coverage by ultrasonic signals for the device, to improve the quality of the touchless technology.

Figure 15:
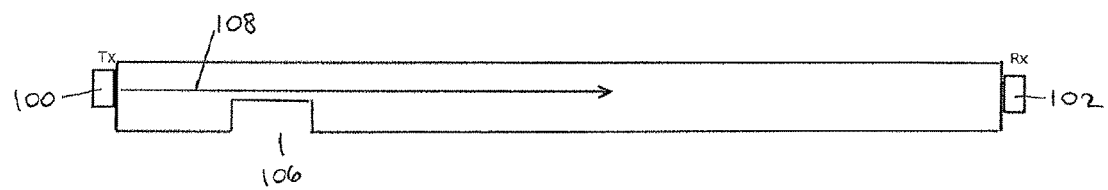
FIG. 15 shows an embodiment of the invention using transducers external to the cavities.

FIG. 15 shows an alternative embodiment in which the transducers are not contained within the cavities. A laser beam 108 is sent directly between the transmitter 100 and receiver 102 across the top of the cavity. As the cavity is made to vibrate by the incoming waves, the amplitude of the received signal changes as the beam passes nearer to or further from the surface of the cavity. The vibrations of the cavity 106 cause the amplitude of the laser beam 108 to change over time. The variation in this curve can be plotted and mapped to find the vibration at a particular time.

Figure 16:
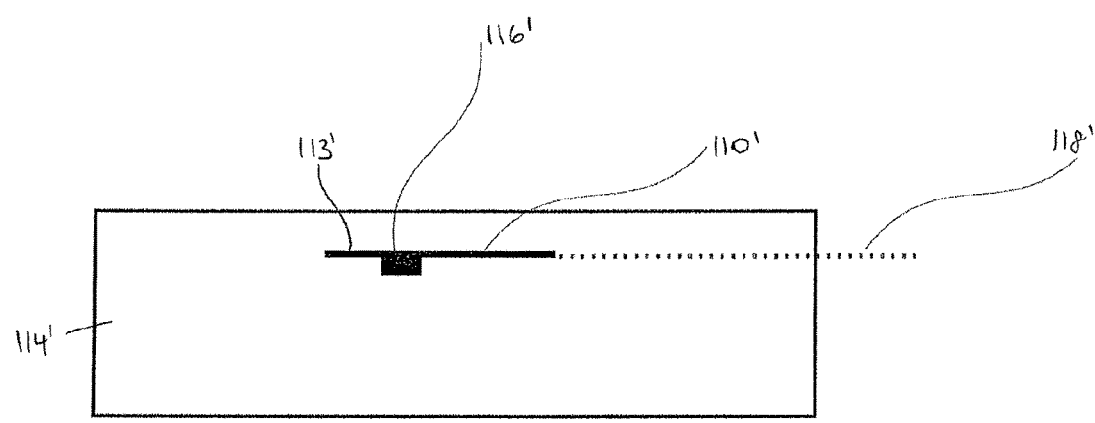
FIG. 16 shows an embodiment using a combination of resonating bars and cavities.

FIG. 16 shows an alternative embodiment of a cover glass of a device. Here, the cavity 113' in the glass 114' conforms to the shape of the ultrasonic transducer. In this embodiment, the transducer is a pressure-sensitive transducer, in the form of a film-type contact microphone 110' which is placed within a cavity 113' in the glass 114'. An AD converter 116' is attached to the resonating film, which is connected via circuitry 118' to the rest of the device. In use, the microphone 110' vibrates according to the vibrations of the incoming ultrasonic pulses, and the AD converter 116' then converts the vibrations into digital data which can be read out.

Figure 17:
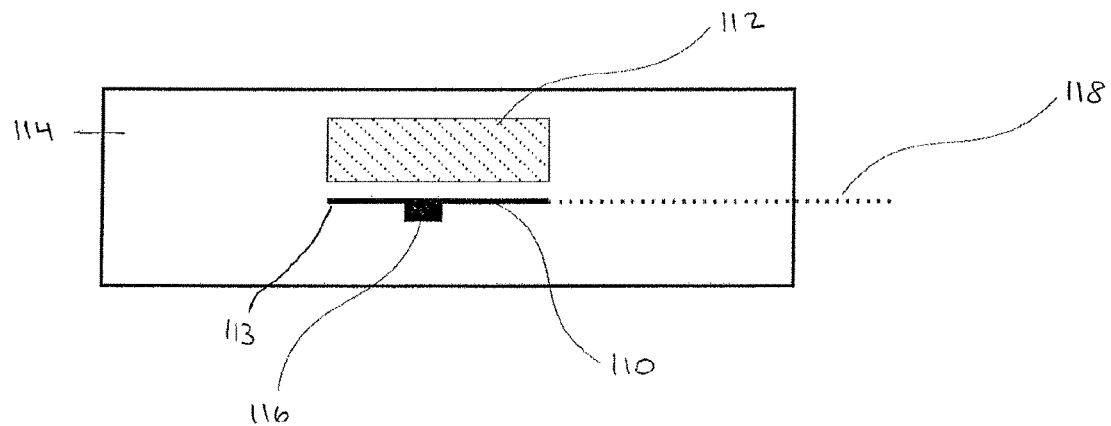
FIG. 17 shows an embodiment which does not use cavities.

As seen in FIG. 17, a pressure-sensitive transducer as used above may be combined with a second cavity 112, placed above the conforming cavity 113. This may be a resonant cavity, acting to enhance the vibrations caused by the incoming ultrasonic waves. The transducer can therefore be placed further from the surface of the glass.

FIG. 18 also shows an embodiment of the device using a microphone 110" embedded in the cover glass 114". In this embodiment, the microphone 110" is placed at the edge of the device, such that only the microphone itself is enclosed in the cover glass 114", rather than the circuitry. This reduces the size of the slit needed to insert the device into the glass 114", as all circuitry is connected from the side of the glass, rather than being held with the microphone under the glass.

FIG. 19 shows a device using microphones as shown in FIGS. 16 to 18. The microphones are placed at the top and bottom of the device, such that they do not interfere with the touch screen region 122 of the device. Alternatively, they could be placed down the sides of the device, or around the entire perimeter.

Figure 20:
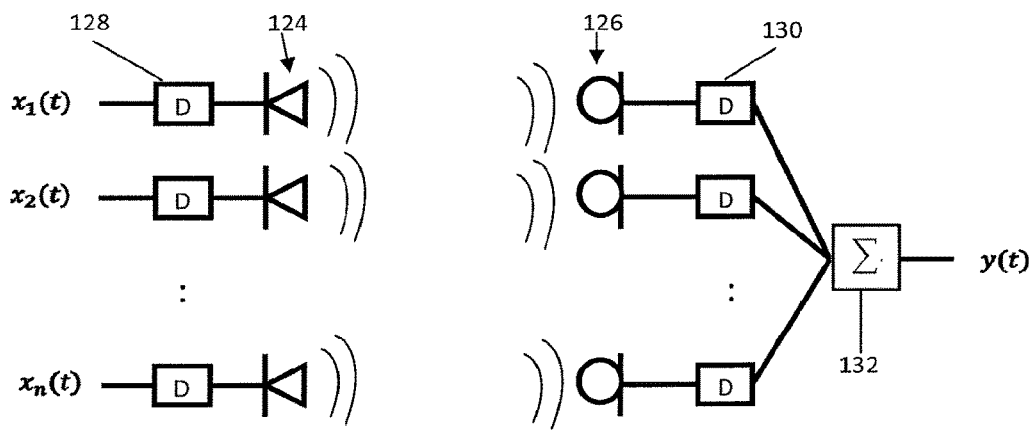
FIG. 20 shows an embodiment of the invention which uses time compensation to account for spatially offset cavities.

FIG. 20 shows an embodiment of the invention in which a plurality of transmitter cavities 124 and receiver cavities 126 are used. Each of the transmitter cavities 124 and receiver cavities 126 is connected to delay logic 128, 130. The receiver cavities 126 are then connected to a combining element 132. In use, in order to account for the spatial offsets between different cavities, delay factors are applied both to the transmitted signals and received signals. A predicted location of an input object is used to apply delay factors to each of the cavities 126 using the delay logic 128. To apply the right compensating delay factor to the transmitted signals the input object position should be known prior to the transmissions. However, perfect knowledge of the position of the input object cannot be expected, especially since the objective of the transmissions is typically to locate the position of the input object. In general, the compensating time shifts may be derived from approximate knowledge of the position of the input object. For example, in the event of active tracking the position estimate obtained in the previous time-step can be used as a proxy. Even though this may produce an error or mismatch the net result may be considerably better than if no compensation was applied. Signals are then transmitted from each of the cavities 124 towards said input object, before being reflected and received by the receiver cavities 126. Upon reception at the receiver cavities 126, a second delay factor is then applied using delay logic 130 to each of the received signals. After the delay factor is added, the received signals can then be combined using the combining element 132, generating the output signal.

Figure 21:
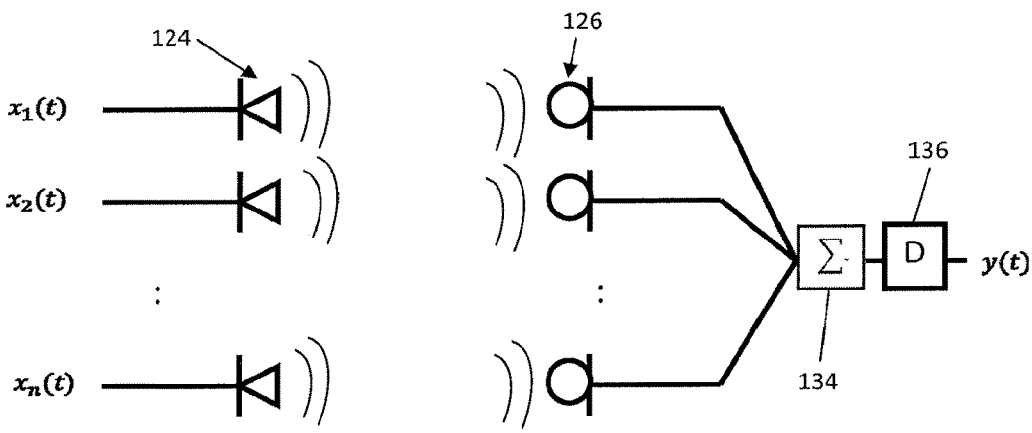
FIG. 21 shows an alternative embodiment of the invention which uses time compensation to account for spatially offset cavities.

FIG. 21 shows an alternative embodiment of the invention in which a plurality of transmitter cavities 124 and receiver cavities 126 are used. Equal numbers of transmitter cavities 124 and receiver cavities 126 are used, so that there is both a transmitter cavity 124 and a receiver cavity 126 with each resonant frequency, which are substantially non-overlapping. In this embodiment, the receiver cavities 126 are connected to a combining element 134, which is then connected to delay logic 136. In use, the transmitter cavities 124 transmit signals towards an input object, which are then reflected to the receiver cavities 126. The received signals are then combined at the combining element 124, before delay factors are applied to the combined signal by the delay logic 136. Different cavities may require different delay factors, but as the cavities have substantially non-overlapping frequencies, different frequency delay factors can be applied to the combined signal, impacting on only the necessary portion of the signal. This allows the hardware to be simplified significantly, as only one delay element 136 is needed for n cavities, as opposed to λ delay elements 128, 130 for the arrangement of FIG. 20.

The embodiment of FIG. 21 could be said to show a plurality of transmitter cavities 124 with one overall receiver. In this case, the received signals y(t) may be represented as $$y(t) = \sum_{i=1}^{n} x_i(t - \tau_i),$$

where $x_i(t)$ is the signal transmitted from the th transmitter cavity 124 and $\tau_i$ is the round trip delay from the th transmitter cavity 124 via the input object and back to the receiver. The received signal may therefore be represented as a superposition of delayed replicas of the transmitted signals. However, as the cavities have different spatial positions, the round trip delay may vary between different cavities. A delay factor may be applied to a transmitted signal to account for a variation in spatial location. For example, instead of $x_i(t)$ the signal $x_i'(t)=x_i(t+\Delta\tau_i)$ is transmitted from the i th transmitter cavity 124, where $\Delta\tau_i=\tau_i-\tau_1$ and i=1,2, . . . , n. The received signal may in this case be represented by $$y(t) = \sum_{i=1}^{n} x_i(t - \tau_1),$$

which is represented as if all cavities are in the same position. The applied delay factors may be dependent on both the positions of the cavities and the position of the input object.

Any of these embodiments for the screen can be used in combination with the methods of measurement mentioned above. The combination of cavities of different sizes provides a wider range of resonant frequencies, increasing the bandwidth available for use in the device.

Thus it will be seen that in accordance with at least preferred embodiments of the invention a touchless gesture detection system can be implemented without needing to breach the continuous glass surface of a smart phone or other device thereby allowing a large number of transducers without compromising the aesthetic design of the device.

The invention claimed is:

1. An electronic device having a touchless user interface for providing at least one input to the device, said touchless user interface comprising at least one ultrasound transmitter arranged to transmit ultrasonic signals having a frequency band and at least one ultrasound receiver arranged to receive reflections of said ultrasonic signals from an input object, wherein the device further comprises a substantially continuous outer surface portion, wherein at least one of the transmitter and the receiver is provided below said outer surface portion in a resonant cavity having a resonant frequency within said frequency band, and wherein the outer surface portion directly above the least one of the transmitter and the receiver arrangement in the resonant cavity is continuous.

2. An electronic device as claimed in claim 1, comprising at least two cavities provided perpendicular to each other on different respective sides of a screen.

3. An electronic device as claimed in claim 1, wherein the cavity conforms to the shape and size of the ultrasonic transducer.

4. An electronic device as claimed in claim 1, wherein an opening is provided in the cavity providing gaseous communication with the exterior of the device via an aperture on a face of the device away from the outer surface portion.

5. An electronic device as claimed in claim 1, wherein a composite cavity is provided having discrete sections with different resonant frequencies but with each section being coupled for communication with a common transducer.

6. An electronic device as claimed in claim 1, wherein the cavity is filled using a material different to the bulk material of the outer surface portion.

7. An electronic device as claimed in claim 1, comprising a resonant cavity which does not contain a transducer.

8. An electronic device as claimed in claim 1, arranged to generate an estimated location of the input object and to use said estimated location to process said reflections to characterise the location and/or movement of the input object.

9. An electronic device as claimed in claim 1 wherein the outer surface portion comprises an entire face of the device.

10. An electronic device as claimed in claim 1 wherein the outer surface portion is disposed on a face of the device intended to face the user in use and the at least one transmitter is arranged to transmit towards an input object in front of the device.

11. An electronic device as claimed in claim 1, wherein the outer surface portion comprises a touch screen.

12. An electronic device as claimed in claim 11, comprising one or more transducers placed around the edge of the touch screen but still under the same outer surface portion as a touch screen.

13. An electronic device as claimed in claim 1, wherein the outer surface portion comprises glass.

14. An electronic device having a touchless user interface for providing at least one input to the device, said touchless user interface comprising at least one ultrasound transmitter arrangement arranged to transmit ultrasonic signals and at least one ultrasound receiver arrangement arranged to receive reflections of said ultrasonic signals from an input object, wherein the device further comprises a substantially continuous outer surface portion, wherein at least one of the transmitter and the receiver arrangement is provided below said outer surface portion and comprises an acoustic cavity having an echoic signature based on its shape, the device being arranged to process reflections received by the receiving arrangement to determine a direction from which the reflection was received by taking into account said echoic signature, wherein the outer surface portion directly above the least one of the transmitter and the receiver arrangement in the resonant cavity is continuous.

15. An electronic device as claimed in claim 14, wherein the acoustic cavity is elongate.

16. An electronic device as claimed in claim 14, wherein a depth of the cavity varies along a length of the cavity.

17. An electronic device as claimed in claim 14, comprising a plurality of cavities.

18. An electronic device as claimed in claim 14, comprising at least two cavities provided perpendicular to each other on different respective sides of a screen.

19. An electronic device as claimed in claim 14, wherein the cavity conforms to the shape and size of the ultrasonic transducer.

20. An electronic device as claimed in claim 14, wherein an opening is provided in the cavity providing gaseous communication with the exterior of the device via an aperture on a face of the device away from the outer surface portion.

21. An electronic device as claimed in claim 14, wherein a composite cavity is provided having discrete sections with different resonant frequencies but with each section being coupled for communication with a common transducer.

22. An electronic device as claimed in claim 14, wherein the cavity is filled using a material different to the bulk material of the outer surface portion.

23. An electronic device as claimed in claim 14, comprising a resonant cavity which does not contain a transducer.

24. An electronic device as claimed in claim 14, arranged to generate an estimated location of the input object and to use said estimated location to process said reflections to characterise the location and/or movement of the input object.

25. An electronic device as claimed in claim 14 wherein the outer surface portion comprises an entire face of the device.

26. An electronic device as claimed in claim 14 wherein the outer surface portion is disposed on a face of the device intended to face the user in use and the at least one transmitter is arranged to transmit towards an input object in front of the device.

27. An electronic device as claimed in claim 14, wherein the outer surface portion comprises a touch screen.

28. An electronic device as claimed in claim 27, comprising one or more transducers placed around the edge of the touch screen but still under the same outer surface portion as a touch screen.

29. An electronic device as claimed in claim 14, wherein the outer surface portion comprises glass.

\* \* \* \* \*